(12) United States Patent
Dooley et al.

(10) Patent No.: US 7,058,057 B2
(45) Date of Patent: Jun. 6, 2006

(54) NETWORK SWITCH PORT TRAFFIC MANAGER HAVING CONFIGURABLE PACKET AND CELL SERVICING

(75) Inventors: David L. Dooley, San Jose, CA (US); Robert J. Divivier, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 752 days.

(21) Appl. No.: 09/847,077

(22) Filed: May 1, 2001

(65) Prior Publication Data

US 2002/0163922 A1   Nov. 7, 2002

(51) Int. Cl.
*H04L 12/28* (2006.01)

(52) U.S. Cl. ............... 370/394; 370/395.7; 370/428

(58) Field of Classification Search ............ 370/499, 370/412, 413, 395, 397, 409, 389, 394, 400, 370/428, 471, 474, 535, 395.7; 709/235, 709/244; 711/5, 157, 158, 143, 133, 171; 710/28, 52–60

See application file for complete search history.

(56) References Cited

U.S. PATENT DOCUMENTS

| | | | | |
|---|---|---|---|---|
| 5,799,014 A * | 8/1998 | Kozaki et al. | ............... | 370/358 |
| 5,859,849 A * | 1/1999 | Parks | ................ | 370/395.72 |
| 6,052,368 A * | 4/2000 | Aybay | ................ | 370/357 |
| 6,317,432 B1 * | 11/2001 | Ono et al. | ............... | 370/395.2 |
| 6,463,063 B1 * | 10/2002 | Bianchini et al. | ...... | 370/395.53 |
| 6,487,202 B1 * | 11/2002 | Klausmeier et al. | ..... | 370/395.1 |
| 6,757,791 B1 * | 6/2004 | O'Grady et al. | ............ | 711/154 |
| 2001/0009551 A1 * | 7/2001 | Moriwaki et al. | .......... | 370/395 |
| 2002/0061030 A1 * | 5/2002 | Iny | ............................ | 370/449 |
| 2002/0101871 A1 * | 8/2002 | Takase et al. | ............... | 370/390 |

* cited by examiner

*Primary Examiner*—Chau Nguyen
*Assistant Examiner*—Ian N. Moore
(74) *Attorney, Agent, or Firm*—Smith-Hill & Bedell (57) ABSTRACT

An input or output switch port for a network switch converts each incoming packet into a cell sequence stores each cell in a cell memory. The switch port includes a traffic manager for queuing cells for departure from the cell memory and then signaling the cell memory to read out and forward cells in the order they are queued. The traffic manager selectively queues cells for departure on either a cell-by-cell or sequence-by-sequence basis. When cells are queued for departure on a cell-by-cell basis, cells of two or more sequences may be alternately read out and forwarded from the cell memory. Thus cells of different sequences may be interleaved with one another as they depart the cell memory. When a cell sequence is queued on a sequence-by-sequence basis all of its cells are read out of the cell memory and forwarded as a contiguous sequence and are not interleaved with cells of other sequences of the same departure queue. Each packet includes a flow identification number (FIN) value and the traffic manager determines from the packet's FIN whether to queue cell sequences derived from the packet on a cell-by-cell or sequence-by-sequence basis.

12 Claims, 6 Drawing Sheets

NETWORK SWITCH PORT TRAFFIC MANAGER HAVING CONFIGURABLE PACKET AND CELL SERVICING

BACKGROUND OF THE INVENTION

1. Field of the Invention

The present invention relates in general to a network switch port for storing incoming packets as sequences of cells, and for thereafter queuing cells to be forwarded selectively on either a sequence-by-sequence or cell-by-cell basis.

2. Description of Related Art

A typical network switch for routing data transmissions (packets) between network buses includes a set of input switch ports for receiving packets arriving on the network buses, a set of output switch ports for forwarding packets outward on the network buses, and a switch fabric for routing packets between the input and output switch ports. Each input switch port includes a buffer memory for storing incoming packets until the input port can forward them to an output switch port. Each output switch port may also include a buffer memory for storing packets it receives via the switch fabric until the port can forward them outward on a network bus.

Since many networks transmit packets of variable size, some switch ports organize their buffer memories into a set of memory blocks, with each block being sufficiently large to hold the largest possible packet. However when most packets are much smaller than the maximum size, much of the storage capacity of most memory blocks is wasted. To make more efficient use of buffer memory space, some input switch ports include a "protocol processor" which converts each incoming packet into a sequence of relatively small standard-sized cells. A traffic manager within the switch port stores each cell of the sequence in a separate buffer memory block just large enough to hold the cell. Converting variable sized packets to sequences of uniformly sized cells enables the port's traffic manager to more efficiently use the data storage capacity of the buffer memory because most memory blocks are completely filled with packet data. An input switch port's traffic manager later reads the cells derived from a packet out of the buffer and forwards them onward to an output switch port via the switch fabric. An output switch port's traffic manager receives and stores cell sequences arriving via the switch fabric and later forwards them to another protocol processor. That protocol processor then reassembles the cell sequence into a packet and forwards it outward on a network bus.

When an input or output switch port's traffic manager receives cell sequences, it must be able to determine the beginning and end of each sequence. Accordingly when the input switch port's protocol processor converts an incoming packet into a cell sequence, it adds a "start of packet" (SOP) and "end of packet" EOP bit to each cell of the sequence. It sets the SOP bit true for the first cell of the sequence, sets the EOP bit true for the last cell of the sequence, and sets SOP and EOP bits of all other packets false. The SOP and EOP bits enable the traffic to determine the start and end of each cell sequence it receives. Similarly when the input switch port's traffic manager forwards a cell sequence to an output switch port's traffic manager, the output switch port's traffic manager can check the cells' SOP and EOP bits to determine the sequence start and end.

Some network switches give an input switch port exclusive access to an output switch port while it is sending a cell sequence to an output port to ensures that the output port's traffic manager receives each cell of a sequence without interruption so that it can easily group the cells according to sequence based on the SOP and EOP bits included in the cells. However when an input switch port has exclusive access to an output switch port, all other input switch ports are prevented from forwarding cells to that output port until the input switch port having exclusive access is finished forwarding cells to the output switch port. Since input switch ports typically queue packets for departure from their buffer memories according to cell sequences and/or time of arrival, an input switch port that is ready to send its "head of line" cell sequence to an output switch port currently being accessed by another input switch port can be blocked from forwarding any cells from its departure queue until it obtains access to the output switch port that is to receive the cell sequence at the head of the departure queue. Thus, for example, while one input switch port is sending a particularly long cell sequence to an output switch port, other input switch ports having only short sequences destined for that output port could be blocked from forwarding any cells from their departure queues to any other output port for a relatively long time.

One way some network switches reduce such "head of line blocking" is to require input switch ports to compete with one another for access to the same output switch port on a cell-by-cell basis. Since in such systems cell sequences derived from different packets can arrive at the switch port in an interleaved fashion, the traffic manager in each output switch port must be able to sort the sequences out. For example, the protocol processor in each input switch port may insert additional data into each cell to identify the sequence to which the cell belongs. In some networks each packet includes a flow identification number (FIN) that is unique to the packet's combination of source and destination switch port. An input switch port's protocol processor can include the packet's FIN in each cell of the sequence derived from the packet so that an output port that later receives interleaved sequences can then sort them out according to FIN.

Whether a traffic manager queues cell sequences for departure on a cell-by-cell or sequence-by-sequence basis depends on the whether the devices that are to receive the cells are able to sort out interleaved sequences. Input switch ports generally, though not always, queue outgoing traffic on a cell-by-cell basis whereas output switch ports generally, though not always, queue outgoing traffic on a sequence-by-sequence basis. What is needed is a traffic manager suitable for use in either an input or output switch port of a network switch that can be dynamically configured to queue cell sequences for departure on either a cell-by-cell basis or a sequence-by-sequence basis.

BRIEF SUMMARY OF THE INVENTION traffic manager for an input or output switch port of a network switch in accordance with the invention receives cell sequences derived from network data transmissions and stores each cell in a cell memory.

In accordance with one aspect of the invention, the traffic manager forwards cells from the cell memory selectively either on a cell-by-cell or sequence-by-sequence basis. When cells are forwarded on a cell-by-cell basis, cells of two or more sequences the traffic manager alternately reads out and forwards cells of different sequences from the cell memory such that cells of the different sequences are interleaved with one another as they depart the cell memory. When a cell sequence is forwarded on a sequence-bysequence basis all of its cells are read out of the cell memory and forwarded as an uninterrupted cell sequence, not interleaved with cells of other sequences.

In accordance with a further aspect of the invention, each packet includes a flow identification number (FIN) that tells the traffic manager whether cells of the packet's corresponding cell sequence are to be queued for departure on a cell-by-cell or sequence-by-sequence basis. Thus the traffic manager forwards some cell sequences on a cell-by-cell basis and forwards other cell sequences on a sequence-by-sequence basis depending on the value of the FIN number incorporated into each cells sequence's corresponding packet.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

Network Switch

Figure 1:
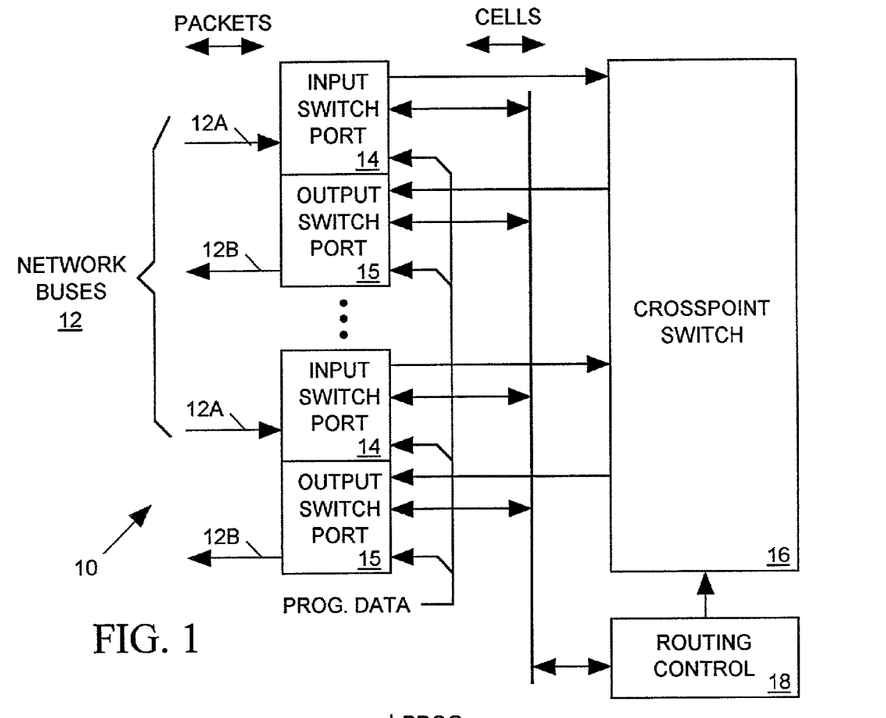
FIG. 1 illustrates a network switch 10 in accordance with the invention for routing network packets between network buses.

FIG. 1 illustrates a network switch 10 in accordance with the invention for routing network transmissions (packets) between a set of network buses 12. Network switch 10 includes input switch ports 14, output switch ports 15, a crosspoint switch 16, and a routing control circuit 18. Each input switch port 14 receives incoming packets arriving on a separate input bus 12A and each output port 15 forwards outgoing packets on a separate output bus 12B. Although not shown in FIG. 1, each input switch port 14 may receive packets on more than one incoming bus 12A and each output port may forward outgoing packets on more than one outgoing bus 12B. Crosspoint switch 16 selectively provides signal paths between input switch ports 14 and output ports 15 in response to control data from routing control circuit 18 based on routing requests from input switch ports 14.

Incoming packets arriving on buses 12A are network data transmissions that may be of any of a variety of formats such as, for example, variable length Ethernet packets. Each input switch port 14 converts each incoming packet to a sequence of one or more "cells" of uniform size and format, and stores each cell in an internal cell memory. Based on information included in each packet arriving on one of buses 12A, the input switch port 14 that received the packet determines which output switch port 15 must forward the packet outward on one of outgoing buses 12B toward its intended destination. The receiving input switch port 14 then requests routing control circuit 18 to establish a signal path through crosspoint switch 16 to the appropriate output switch port 15. When routing control circuit 18 grants the request, the receiving input switch port 14 sequentially forwards all of the cells of the packet to the forwarding output switch port 15 via crosspoint switch 16. That output input switch port 15 stores the cells in its own cell memory as they arrive. After receiving all of the cells derived from the incoming packet, the output switch port 15 reassembles the packet from those cells and forwards the packet outward on one of outgoing network buses 12B.

Switch Ports

Figure 2A:
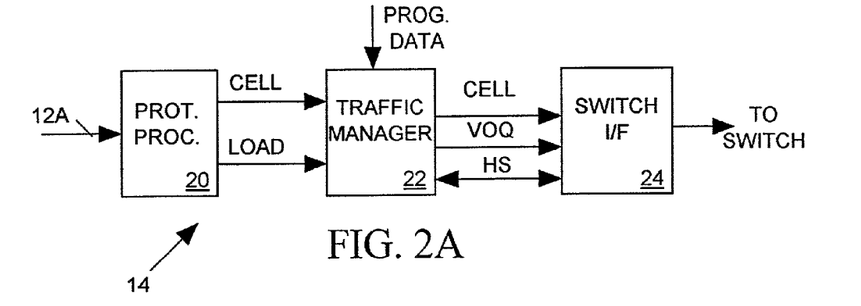
FIG. 2A illustrates one input switch port of FIG. 1 in more detailed block diagram form.

FIG. 2A illustrates one input switch port 14 of FIG. 1 in more detailed block diagram form. Switch port 14 includes a protocol processor 20 for converting incoming packets on bus 12A into cell sequences. As protocol processor 20 produces each cell, it pulses a LOAD signal input to a traffic manager 22 to indicate when a CELL is available. Traffic manager 22 temporarily stores the cells derived from each received packet in an internal cell memory and determines from data included in the packet which output switch port 15 is to forward the packet outward from network switch 10. Thereafter traffic manager sequentially forwards the cells of the packet to a switch interface circuit 24 using handshaking signals HS to coordinate transfer of the cell. Traffic manager 22 also sends a code (VOQ) to switch interface 24 with each cell, the VOQ code identifying the output switch port 15 to receive the cell. Switch interface circuit 24 stores each incoming cell and then requests routing control circuit 18 for a signal path to the forwarding output switch port 15 through crosspoint switch 16 of FIG. 1, and thereafter forwards the cell to the forwarding output switch port 15 via the requested signal path.

Figure 2B:
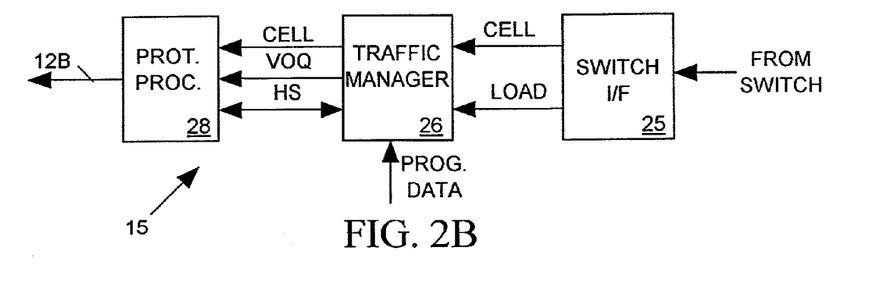
FIG. 2B illustrates one output switch port of FIG. 1 in more detailed block diagram form.

FIG. 2B illustrates one output switch port 15 of FIG. 1 in more detailed block diagram form. When its switch interface 25 receives cells from crosspoint switch 16 it forwards them to a traffic manager 26, pulsing a LOAD signal input to indicate when each cell is available. Traffic manager 26 store each cell in an internal cell memory as its arrives from switch interface 25, and after receiving the last cell of a sequence derived from an incoming packet, traffic manager 26 forwards the cell sequence to a protocol processor 28 using handshaking signals HS to coordinate the transfer. Protocol processor 28 then reassembles the packet from the cell sequence and forwards it outward on the outgoing network bus 12B.

Traffic Manager

Figure 3:
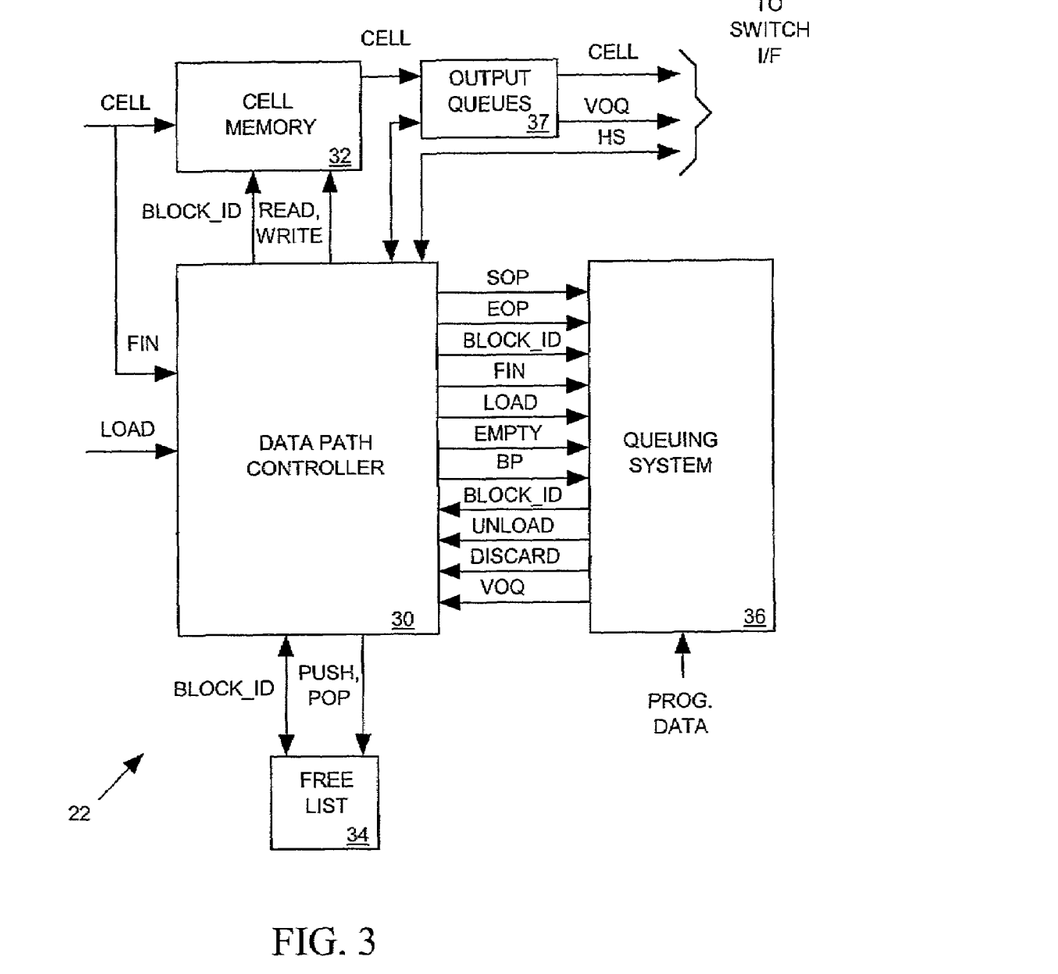
FIG. 3 illustrates a traffic manager of FIG. 2A in more detailed block diagram form.

FIG. 3 illustrates the input switch port's traffic manager 22 of FIG. 2A in more detailed block diagram form. (The output switch port's traffic manager 26 of FIG. 2B is generally similar in design and operation.) Referring to FIG. 3, traffic manager 22 includes a data path controller circuit 30 for responding to each LOAD signal pulse from protocol processor 20 (FIG. 2A) by writing the cell into a block of storage locations within a cell memory 32. Data 32. Data path controller 30 maintains in a memory a "free list" 34 of addresses of unused cell memory blocks. When a cell arrives from protocol processor 20, data path controller 30 pops an identification number (BLOCK_ID) of an available memory block from free list 34, passes the BLOCK_ID to cell memory 52, and pulses a WRITE signal telling cell memory 32 to store the incoming cell in the memory block identified by BLOCK_ID.

The network system assigns each packet to one of a set of "flows". Each flow has a defined class of service influencing, for example, the maximum and minimum rates and priority with the network switch forwards packets assigned to the flow. The flow to which a packet is assigned also determines which output port 15 (FIG. 1) is to forward the packet outward from the network switch. Each incoming data packet includes a "Flow Identification Number" (FIN) identifying the flow to which the packet has been assigned. When protocol processor 20 converts an incoming packet into a sequence of one or more cells, it includes the packet's FIN in each cell along with start of packet (SOP) and end of packet (EOP) bits indicating whether the cell is the first and/or last cell of the sequence of cells derived from the packet.

As it stores a cell in cell memory 32, data path controller 30 passes the cell's FIN, SOP bit and EOP bit, along with the BLOCK_ID of cell's storage location to a queuing system 36 and then pulses a LOAD signal to tell the queuing system when a cell has been stored in cell memory 32. Queuing system 36 uses the FIN, BLOCK_ID, SOP and EOP data to keep track of where the cells of each packet are stored in cell memory 32, to keep track of an order in which cells arrived, to keep track of which cells belong to the same packet, to determine an order in which data path controller 30 is to forward cells out of cell memory 32 to switch interface 24 of FIG. 2A, and to determine the VOQ number associated with the switch output port 15 (FIG. 1) that is to forward the packet outward from the network switch. Programming data (PROG DATA) supplied as input to queuing system 36 tells it how to determine forwarding priority, forwarding rates and forwarding output switch ports for all cells based on the cell's FIN.

Queuing system 36 also determines whether each arriving cell includes a valid FIN. When the FIN of an incoming cell is not valid, queuing system 36 returns a DISCARD signal in response to the LOAD signal telling data path controller 30 to push the cell's BLOCK_ID back on free list 34, thereby effectively discarding the cell without forwarding it to crosspoint switch 16. Programming data input to queuing system 36 also allocates space in cell memory 32 to classes of cells based on their FINs. When the number of cells of a particular class approaches limits defined by the programming data, queuing system 36 signals data path controller 30 to discard some or all of the arriving cells of that class.

When queuing system 36 decides that it is time for data path controller 30 to forward a particular cell out of cell memory 32, it sends the cell's BLOCK_ID and the VOQ number associated with the cell's destination output switch port 15 (FIG. 1) to the data path controller and then pulses an UNLOAD signal. Data path controller 30 then forwards the BLOCK_ID to cell memory 32 and pulses a READ signal, causing cell memory 32 to shift the cell into one of a set of output queues 37, each associated with a separate VOQ number. Controller 30 then pushes the cell's BLOCK_ID back onto free list 34 to make the cell memory block available for holding another arriving cell.

When any one of output queues 37 is not empty, controller 30 uses handshaking signals HS to sequentially forward departing cells out of the output queue 37, along with the VOQ number associated with the output queue to switch interface switch 24 of FIG. 2A as fast as the switch interface circuit can accept them. When output queues 37 are all empty, controller 30 asserts an EMPTY signal input to queuing system 36 telling it that it may temporarily increase the rate at which it normally schedules cells for departure. When its internal departure buffer is nearly full, controller 30 uses a multibit back pressure signal (BP) to tell queuing system 36 to reduce slow down the rate at which it schedules cells for departure. When its internal departure buffer is full, controller 30 sets the BP signal to tell queuing system 36 to stop scheduling cells for departure.

Queuing System

Figure 4:
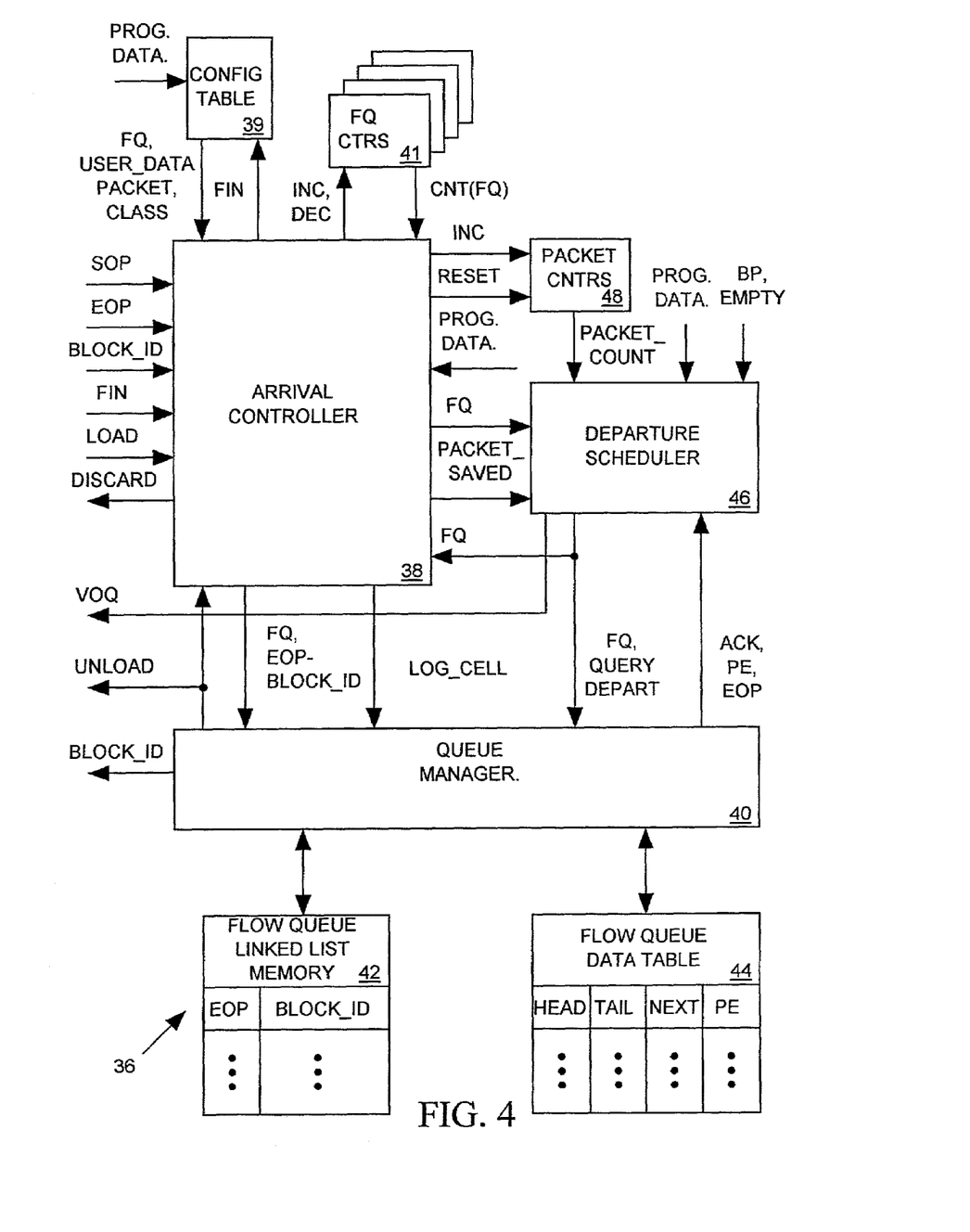
FIG. 4 illustrates the queuing system of FIG. 3 in more detailed block diagram form.

FIG. 4 illustrates queuing system 36 of FIG. 3 in more detailed block diagram form. An arrival controller circuit 38 acquires the SOP, EOP, BLOCK_ID, and FIN data from data path controller 30 of FIG. 3 when the data path controller asserts the LOAD signal to indicate the arrival of a cell at data input terminals of cell memory 32. Arrival controller 38 applies the incoming FIN to a "configuration table" 39, a lookup table programmed by input programming data. Configuration table 39 returns a set of configuration data (FQ, USER_DATA, PACKET, and CLASS) telling queuing system 36 how to handle the cell.

The returned flow queue data FQ identifies the particular flow queue to which the incoming cell has been assigned based on its FIN. When configuration table 39 does not return a valid FQ number, arrival controller 38 signals data path controller 30 to discard the cell. As discussed below, the flow queue to which cells are assigned influences the priority and rate with which the traffic manager forwards those cells to the switch interface and also determines which output switch port is to forward the cell outward from the network switch. The traffic manager may maintain many flow queues. Configuration table 39 assigns all cells of the same flow (i.e., all cells having the same FIN) to the same flow queue, though it may assign several flows to the same flow queue. All cells of the same flow queue are forwarded from the cell memory in the order they arrive, but since some flow queues have higher priority than others, cells assigned to different flow queues do not necessarily depart the cell memory in the order they arrive.

Arrival controller 38 keeps track of the number, CNT (FQ), of cells of each flow queue type stored in cell memory 32 of FIG. 3 using a separate counter 41 for each flow queue. Whenever an incoming cell arrives, configuration table 39 returns the cell's assigned FQ number, and arrival controller 38 increments the output CNT(FQ) of the corresponding FQ counter 37. Whenever a cell is forwarded out of cell memory 32, arrival controller 38 decrements the count associated with the departing cell's FQ.

Input programming data to arrival controller 38 allocates a particular maximum amount of the cell memory space to each flow queue. Arrival controller 38 uses counters 37 to keep track of the number of cells of each flow queue stored in cell memory 32 of FIG. 3 because it needs to know when the portion of the cell memory allocated to each flow queue exceeds various levels defined by input programming data. This can happen when incoming packets for a particular flow queue arrive in the cell memory faster than they can be forwarded. When the amount of cell memory space occupied by a particular flow queue reaches any of those levels, arrival controller 38 begins to signal the data path controller 30 of FIG. 3 to randomly discard some of the incoming cells for that flow queue. Generally, as the number of cells of a given flow queue in the cell memory rises to higher levels, arrival controller 38 more frequently discards incoming cells assigned to that flow queue. The CLASS data configuration table 39 returns to arrival controller 38 in response to a cell's FIN data assigns a "discard weight" to the cell. When the number of cells in the cell memory assigned to a particular FQ reaches a defined limit, data path controller 30 begins to discard cells of that FQ; the higher an incoming cell's discard weight, the greater the probability that data path controller 30 will choose to discard that cell. Thus the CLASS data can be used to give cells of the same flow queue differing levels of discard priority based on their FINs.

A USER_DATA bit returned by configuration table 39 indicates whether the cell contains data from a normal system user or contains management data used internally for network control functions. Cells containing management data are very high priority, though normally low in volume, and are never discarded. Cells from system users can be very high volume, but may be discarded when necessary to keep cell memory 32 from getting too full.

When it decides an incoming cell has a valid FQ and is not to be discarded, arrival controller 38 forwards the cell's FQ number, EOP bit and BLOCK_ID to a queue manager 40 and pulses a LOG_CELL signal to tell a queue manager 40 that cell data is available. Queue manager 40, which keeps track of each cell's storage location in cell memory 32 of FIG. 3, responds to the LOG_CELL signal by adding a new entry in a linked list memory 42. Linked list memory 42 has a separate address for each BLOCK_ID in cell memory 32 of FIG. 3. Queue manager 40 maintains a separate linked list in memory 42 for each flow queue, and each entry in a flow queue's linked list is associated with a cell stored in cell memory 32 that has been assigned to that particular flow queue. Each cell's FQ linked list 42 entry is stored at the memory 42 address indicated by the cell's BLOCK_ID and includes the cell's EOP bit and the BLOCK_ID of the next arriving cell, if any, of the same flow queue.

When a cell arrives in cell memory 32, it is necessary for queue manager 40 to keep track of whether an individual cell was part of a group of cells derived from a single incoming packet only when the cells of that sequence are to be forwarded from the cell memory as an uninterrupted cell sequence (on a "sequence-by- sequence" basis) without being interleaved with cells of any other cell sequence. Accordingly, when the PACKET bit returned by configuration table 39 is true, arrival controller 38 forwards the cell's original EOP bit state to queue manager 40 with the cell's FQ and BLOCK_ID numbers, thereby preserving each cell's identity as a part of a multiple cell sequence derived from a packet. Thereafter, that cell and all other cells of its sequence are scheduled for departure from the cell memory as an uninterrupted sequence not interleaved with any other cell sequences. However when all cells of a sequence derived from a packet indicates are to be forwarded from the cell memory on a cell-by-cell basis, such that the cell sequence may be interleaved with other cell sequences, configuration table 39 returns a logically false PACKET data bit to arrival controller 38 in response to the FIN number included in each cell of the sequence. This tells arrival controller 38 to automatically set logically true the EOP bit it forwards to queue manager 40 with each incoming cells' FQ and BLOCK_ID number. In such case, each cell of the sequence is thereafter treated like it is a single-cell sequence rather than a part of a larger sequence of cells when it is thereafter scheduled for departure from the cell memory. This enables that particular cell sequence to later depart the cell memory interleaved with other cell sequences.

Queue manager 40 keeps the BLOCK_ID of the longest-stored and most recently stored cells of each FQ in HEAD and TAIL fields of an entry of a flow queue data table 44 associated with the FQ. The HEAD cell is the next cell to be actually forwarded from the cell memory. Departure scheduler 46 internally queues cells of each flow queue for departure, and signals queue manager when each cell reaches the head of a queue and is ready to be forwarded out of the cell memory. Queue manager 40 stores the BLOCK_ID of the next cell to be queued for departure from the cell memory is stored in the NEXT field. As discussed below, queue manager 40 updates the NEXT field whenever departure scheduler queues a cell of the flow queue for departure.

A packet end (PE) bit stored in table 44 indicates whether any currently stored cell of the flow queue has an EOP bit that is set true. When cells of the flow queue are forwarded on a cell-by-cell basis, then all cells of that flow queue will have true EOP bits and the PE bit in the table 44 entry for that flow queue will always be true as long as any cell of the flow queue resides in the cell memory. However, when cells of a flow queue are forwarded on a packet-by-packet basis, then only the last cell of each packet's cell sequence has a true EOP bit. In such case the PE field of the entry in table 44 will only be true if the last cell of at least one packet sequence currently resides in the cell memory. As discussed later, the PE bit field in table 44 prevents the first cells of a packet of a flow queue that is to be scheduled for departure from the cell memory a packet-by-packet basis from being scheduled for departure before the last cell of the packet has arrived in the cell memory. Queue manager 40 updates the TAIL and PE fields of table 44 whenever a cell actually arrives in the cell memory, updates the NEXT field whenever next cell of a flow queue is scheduled for departure from the cell memory, and updates the HEAD field whenever a cell is actually forwarded from the cell memory.

When any cell of a packet arrives with an EOP bit set true, arrival controller 38 transmits the incoming FQ number for that flow queue to a departure scheduler 46 and pulses a PACKET_SAVED signal to indicate that all of the cells of an incoming packet have been saved in the cell memory 32 of FIG. 3. Arrival controller 38 maintains a count (PACKET_COUNT) in one of a set of counters 48 of the number of cells for each arriving packet. Arrival controller 38 increments the count whenever a cell arrives and resets the count whenever it receives an SOP signal from data path controller 30. When departure scheduler 46 receives the PACKET_SAVED signal it acquires the current count (PACKET_COUNT) from one of packet counters 48. The incoming FQ and PACKET_COUNT data tell departure scheduler 46 the flow queue number of the most recently arrived packet and the number of cells that were derived from the packet.

Departure Scheduler

Figure 5:
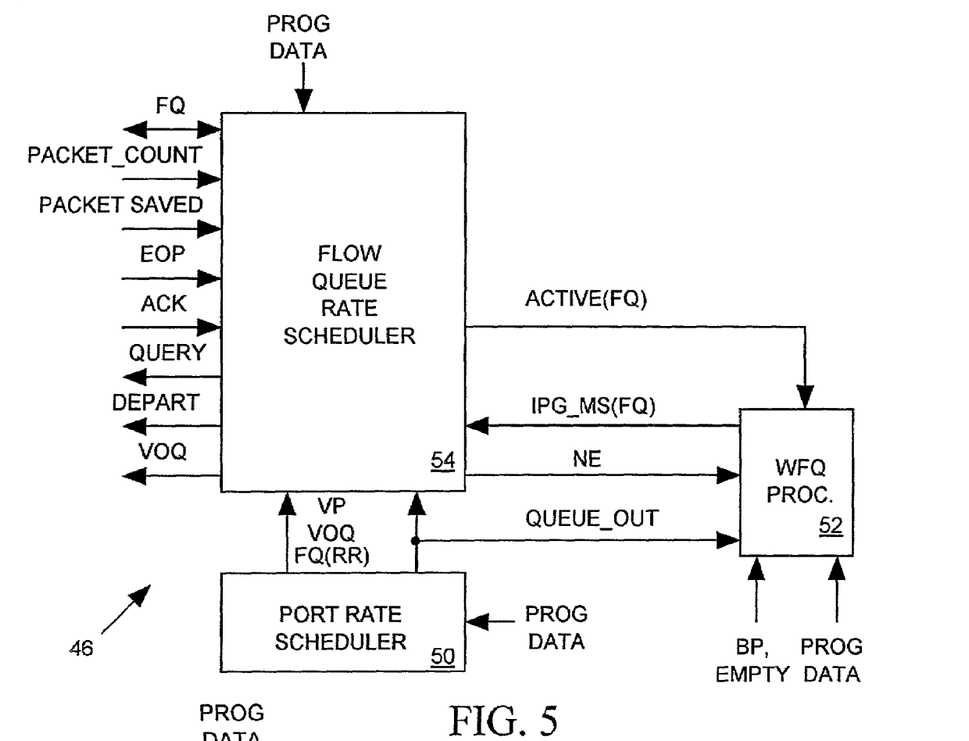
FIG. 5 illustrates the departure scheduler of FIG. 4 in more detailed block diagram form.

FIG. 5 illustrates departure scheduler 46 of FIG. 4 in more detailed block diagram form. Departure scheduler 46 determines a rate at which cells of each flow queue are to be forwarded from the cell memory, schedules cells of each flow queue for departure from the cell memory 32 of FIG. 3, and then signals queue manager 40 whenever it is time to actually forward a next cell of a flow queue out of the cell memory.

Figure 6:
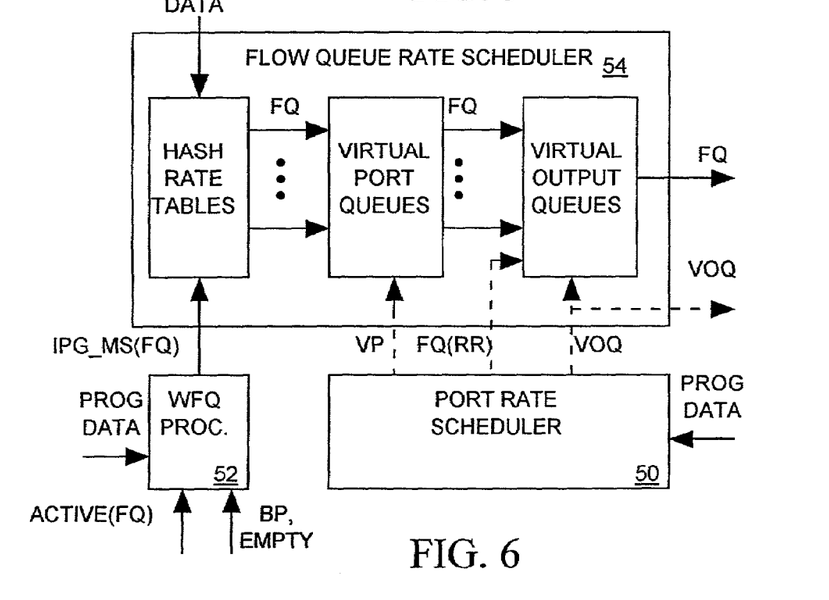
FIG. 6 is a data flow diagram illustrating a manner in which the departure scheduler of FIG. 5 allocates cell forwarding bandwidth.

FIG. 6 is a simplified data flow diagram illustrating a manner in which departure scheduler 46 flow queue (FQ). As mentioned above, all cells having the same FIN are assigned to the same flow queue, and cells of more than one FIN may be assigned to the same flow queue. Departure scheduler 46 maintains a separate "virtual output queue" (VOQ) for each output switch port 15 (FIG. 1) and assigns all cells of the same flow queue to the same VOQ so that they are forwarded via crosspoint switch 16 (FIG. 1) to the same output switch port 15. More than one flow queue may be assigned to the same VOQ since more than one flow may be directed to the same output switch port.

The flow queue to which a packet's FIN is assigned also influences the rate at which cells forming that packet, and all other packets assigned to the same flow queue, are forwarded to the output switch port 15. As illustrated in FIG. 6, a flow queue rate scheduler 54 controls allocation of forwarding bandwidth to the various flow queues. Hash rate tables within flow queue rate scheduler 54 generate the FQ number corresponding to each flow queue at a rate corresponding to the allocated forwarding bandwidth of cells assigned to the corresponding flow queue.

A flow queue is considered "active" when the cell buffer currently stores at least one cell assigned to that flow queue. Programming data input to flow queue rate scheduler 54 tells it to allocate a specified minimum portion of the switch port's cell forwarding bandwidth to each active flow queue. Thus flow queue rate scheduler 54 generates the FQ number of each flow queue at some defined minimum rate when the flow queue is active. A "weighted fair queuing" (WFQ) processor 52 also allocates among all active flow queues portions of the switch port's cell forwarding bandwidth not otherwise needed to provide the minimum bandwidths allocated to all active flow queues. WFQ processor 52 supplies data IPG_MS(FQ) for each flow queue to flow queue rate scheduler 54 telling it how much of the excess bandwidth to allocate to each flow queue in addition to the flow queue's assigned minimum rate. The hash rate tables adjust the rate at which the generates the FQ number of each active flow queue accordingly.

Figure 7:
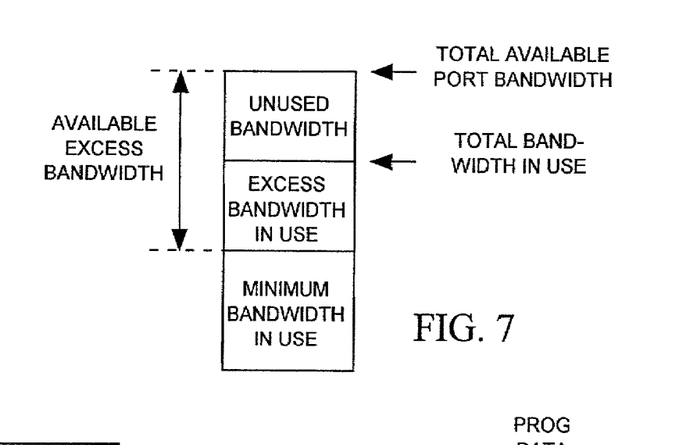
FIG. 7 is a chart illustrating allocation of a switch port's cell forwarding bandwidth among flow queues.

FIG. 7 graphically illustrates how the switch port's available bandwidth is allocated. The sum of minimum bandwidths of all flow queues is defined as the "minimum bandwidth in use"The difference between the port's maximum cell forwarding bandwidth and its minimum bandwidth in use, is the port's "available excess bandwidth" that may be allocated among active flow queues in addition to their assigned minimum bandwidths. Since each flow queue also has a maximum allowable bandwidth, it may not always be possible to allocate all of the switch port's excess bandwidth among the active flow queues. Thus FIG. 7 defines the portion of the available excess bandwidth not currently allocated to flow queues as "unused bandwidth".

Referring again to FIG. 6, port rate scheduler 50 allocates the switch port's available cell forwarding bandwidth among a set of N "virtual ports"and each flow queue is assigned to a particular one of those virtual ports. More than one flow queue may be assigned to each virtual port. As flow queue rate scheduler 54 generates FQ numbers, each FQ number is shifted into one of a set of virtual port queues (VPQs), each corresponding to a separate one of the virtual ports. The VPQs are first-in, first-out (FIFO) buffers which store and forward the FQ numbers in the order received. Port rate scheduler 50 (FIG. 5) generates an identification number (VP) of each virtual port at rate at which cells of flow queues assigned to that virtual port are to be forwarded. Each generated VP number tells the associated virtual port queue to forward its longest stored FQ number to one of a set of "virtual output queues" (VOQs), FIFO buffers internal to flow queue rate scheduler 54 of FIG. 5.

Flow queue rate scheduler 54 (FIG. 6) includes a separate VOQ corresponding to each network switch output port 15 (FIG. 1). Each virtual port is assigned to one of the VOQs, though more than one virtual port may be assigned to the same VOQ. Each network switch input port 14 is assigned a certain bandwidth with which it may forward cells to each network switch output port 15. Port rate scheduler 50 allocates available bandwidth associated with each network switch output port 15 by controlling the rate at which it generates the VOQ number of the associated virtual output queue. It further allocates the bandwidth among the virtual ports assigned to each virtual output queue by controlling the rate at which it generates the VP numbers of those virtual ports.

Whenever port rate scheduler 50 generates the VP number of a virtual port, thereby causing one of the virtual port queues to forward an FQ number to the virtual output queues, it also generates the VOQ number to which that virtual port has been assigned. The VP number determines which one of the virtual output queues shifts in the FQ number. The VP output of port rate scheduler 50 also tells one of the VOQs to generate its longest-stored FQ number as output. As described below, one cell of a given flow queue is forwarded from the cell memory whenever the FQ number of that flow queue is produced by the VOQs. The VOQ number produce by port rate scheduler 50 which cause the VOQs to generate that FQ number indicates which network output switch port 15 (FIG. 1) is to receive the forwarded cell.

Thus flow queue rate scheduler 54 allocates a cell forwarding rate (bandwidth) to each to each active flow queue and controls the rate at which cells of each flow queue are forwarded out of the cell memory by generating the FQ number of that flow queue at the flow queue's allocated forwarding rate. Port rate scheduler 50 controls the rate at which the network switch input port forwards cells to each output switch port 15 (FIG. 1) by generating a VOQ number associated with the network output port at that rate. Port rate scheduler 50 further allocates the forwarding bandwidth for each virtual output queue among one or more virtual ports by generating the VP number of each virtual port at the forwarding rate allocated to the virtual port.

Port Rate Scheduler

Figure 8:
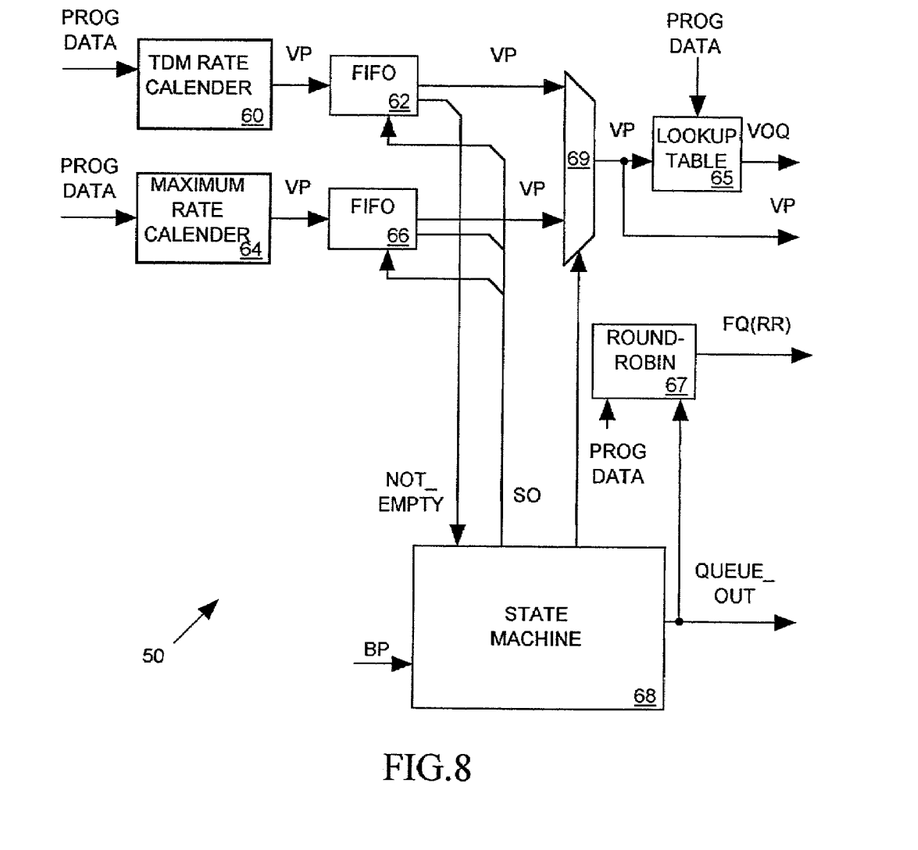
FIG. 8 illustrates the port rate scheduler of FIG. 5 in more detailed block diagram form.

FIG. 8 illustrates port rate scheduler 50 of FIG. 5 in more detailed block diagram form. As discussed above, port rate scheduler 50 allocates cell forwarding bandwidth among the various virtual ports and virtual output queues by generating the VP number of each virtual port and the VOQ number of each virtual output queue at the appropriate rates. A virtual port may handle either of two types of traffic: "time domain multiplexing" (TDM) traffic that must be forwarded with relatively constant time intervals between cells at a particular assigned rate, and "maximum rate" traffic that is to be forwarded at some average maximum rate but which may be forwarded with somewhat more variable intervals between cells. Port rate scheduler 50 includes a TDM rate calendar 60 programmed by input programming data which generates the identification number (VP) of each virtual port at the constant rate at which that virtual port is to forward TDM traffic. A maximum rate VOQ calendar 64 also programmed by input programming data, generates the ID number (VP) of each port handling maximum rate traffic, the port's assigned maximum rate.

The VP outputs of TDM rate calendar 60 and maximum rate calendar 64 are shifted into FIFO buffers 62 and 66 as they are generated. A state machine 68 monitors FIFO buffers 62 and 66. When either one of those buffers is not empty, state machine 68 signals a multiplexer 69 to send the longest stored VP in that FIFO buffer to a translation table 65 programmed by input programming data. Since timing is more important for TDM traffic, state machine 68 always gives FIFO buffer 62 priority with both FIFO buffers are not empty.

The VP output of multiplexer 65 is sent to port rate scheduler 54 for controlling its internal virtual port queues in a manner described in more detail below. A lookup table 65 programmed by input programming data generates the VOQ number of the virtual output queue to which the virtual port identified by the VP output of multiplexer 69 has been assigned. That VOQ number is also sent to flow queue rate scheduler 54 for use in controlling the virtual output queues in a manner described below.

When both FIFO buffers 62 and 66 are empty, state machine 68 periodically signals a "round-robin" generator 67 to generate an output flow queue number FQ(RR) and asserts the QUEUE_OUT signal. That tells flow queue rate scheduler 54( FIG. 6) to queue a cell of the flow queue identified by the FQ(RR) number for departure regardless of the VP to which it has been assigned. Round-Robin generator 67, programmed by input programming data, generates the FQ number of each network flow queue in turn.

State machine 68 supplies a QUEUE_OUT signal pulse to flow queue rate scheduler 50 to indicate when its VP, VOQ and FQ(RR) output values are valid. When data path controller 30 sets the back pressure signal BP to indicate that its internal cell buffers are full or becoming full, state machine 68 temporarily reduces the rate at which it generates VOQ and VP numbers, thereby reducing the rate at which cells are forwarded from cell memory 32 (FIG. 3) to the switch interface.

Flow Queue Rate Scheduler

Figure 9:
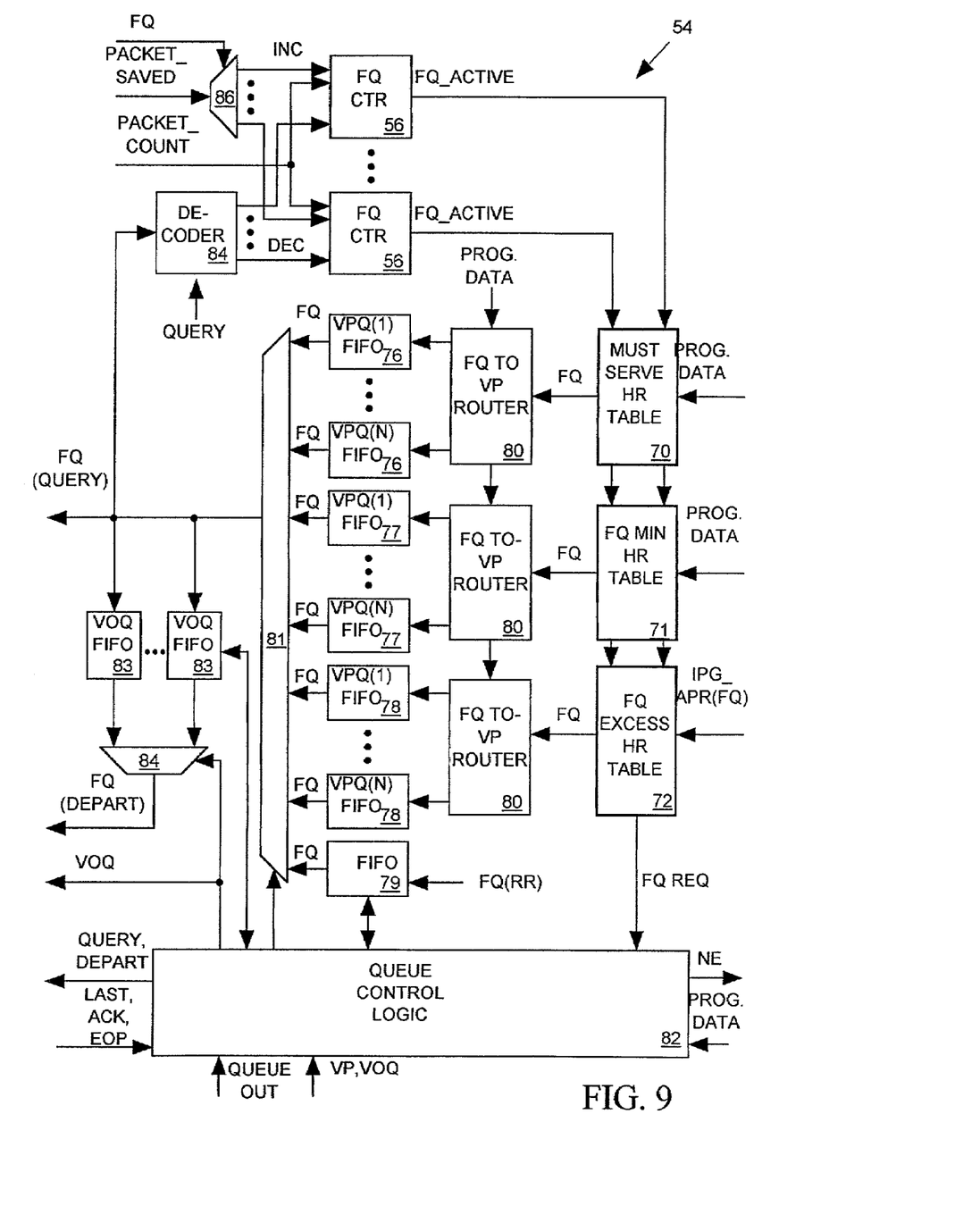
FIG. 9 illustrates the flow queue rate scheduler of FIG. 5 in more detailed block diagram form.

FIG. 9 depicts flow queue rate scheduler 54 of FIG. 5 in more detailed block diagram form. Flow queue rate scheduler 54 includes a set of hash rate (HR) tables 70–72, each for generating a sequence of FQ numbers. Flow queue bandwidth is normally allocated on a cell-by-cell basis and the rate at which each FQ number is generated determines the average rate at which cells assigned to that FQ number are forwarded out of cell memory 32 of FIG. 3.

Flow queue counters 56 keep track of the number of cells currently residing in the cell memory for each flow queue and assert FQ_ACTIVE(FQ) signal inputs to tables 70–72 to tell them which flow queues have one or more cells currently residing in the cell memory. Arrival controller 38 (FIG. 4) uses packet counters 48 to keep track of the number of cells in each arriving packet. When the last cell of a packet arrives, it asserts a PACKET_SAVED signal. A multiplexer 86 controlled by an FQ output of arrival controller 38 routes the PACKET_SAVED signal as an increment signal INC to the appropriate flow queue counter 56 which increments its current count by the value of the PACKET_COUNT data. A decoder 84 decodes the FQ output of multiplexer 81 in response to each pulse of the QUERY signal to supply a DEC signal to one of flow queue counter 56 causing it to decrement its cell count.

Each flow queue counter 56 asserts its FQ_ACTIVE output when its count rises above zero to tell tables 70–72 that a corresponding flow queue is "active" in that cells of that flow queue reside in the cell memory waiting to be forwarded. One or more of tables 70–72 then begins generating FQ numbers for that flow queue at the average rate at which cells of that flow queue are to be forwarded from the cell memory. Each flow queue counter 56 stops asserting its FQ_ACTIVE output when its count rises falls to zero to tell tables 70–72 that no cells of a particular FQ reside in the cell memory and that they should stop generating FQ numbers for that flow queue.

Some high priority, low volume traffic such as network management traffic may be assigned to "must serve" flow queues accorded fixed forwarding bandwidth defined by programming input data. A "must serve" hash rate table 70 generates the FQ number of each currently active must serve flow queue at the rate at which cells of that flow queue must be forwarded. A lower priority flow queue may be allocated a minimum rate at which cells assigned to that flow queue must be forwarded when the flow queue is active. When such a flow queue is active, an FQ minimum HR table 71 produces an output FQ number sequence at for each flow queue at that flow queue's allocated minimum forwarding rate, as defined by input programming data.

Weighted fair queuing processor 52 of FIG. 5 may also allocate a portion of a virtual port's excess bandwidth to each active FQ in addition to the must serve rate or minimum rates allocated by tables 70 and 71. An FQ excess HR table 72 produces the FQ number of every active flow queue at a rate determined by the excess forwarding bandwidth currently allocated to that flow queue by data IPG_APR(FQ) supplied by WFQ processor 52. The rate at which the traffic manager forwards cells of each flow queue therefore matches the rate at which tables 70–72 generate each flow queue's FQ number.

The total forwarding bandwidth of the input switch port is allocated among N virtual ports, and each flow queue is assigned to one of those N virtual ports. Flow queue rate scheduler 54 includes a set of three FIFO buffers 76–78 for each of the N virtual ports. A set of three router circuits 80 route each FQ output of tables 70–72 to the appropriate one of VOQ FIFO buffers 76–78 as indicated by input programming data. High priority FIFO buffers 76 receive FQs from must serve HR table 70, medium priority FIFO buffers 77 receive FQs from FQ minimum HR table 71, and low priority FIFO buffers 78 receive FQs from excess HR table 74. Port rate scheduler 50 (FIG. 8) shifts any generated FQ(RR) number into a lowest priority FIFO buffer 79.

Cells of each flow queue are scheduled for departure from the cell memory by shifting the flow queue's FQ number into one of a set of VOQ FIFO buffers 83. When cells of a flow queue are scheduled for departure from the cell memory on a cell-by-cell basis, every FQ number referencing that flow queue is that arrives at the inputs of VOQ buffers 83 via multiplexer 81 is shifted into the particular VOQ buffer 83 corresponding to the flow queues destination output switch port. On the other hand, when cells of a flow queue are scheduled for departure from the cell memory on a sequence-by-sequence basis, only one instance of an FQ number referencing that flow queue is shifted into the appropriate VOQ buffers 83 for each cell sequence that arrives in the cell memory. All other instances of that FQ number arriving at VOQ buffers 83 via multiplexer 81 are discarded and not shifted into the VOQ buffer 83.

When an FQ number reaches the front of one of virtual output queues 83, one or more cells of a flow queue may be forwarded out of the cell memory. For flow queues scheduled for departure on a cell-by-cell basis, only one cell is forwarded out of the cell memory for each FQ number arriving at the front of a virtual output queue 83. When a flow queue is scheduled for departure on a sequence-by-sequence basis, every cell of a sequence assigned to that flow queue is forwarded out of the cell memory for each instance of the flow queue's FQ number arriving at the front of a virtual output queue 83.

Whenever port rate scheduler 50 (FIG. 8) generates a VP/VOQ number pair and pulses the QUEUE_OUT signal, it tells queue control logic 82 that one cell or one packet of a flow queue assigned to the virtual port identified by the VP number (of value 1 to N) may be queued for departure, and that one cell of a flow queue assigned to the identified virtual port may be actually departed from the cell memory.

In responding to the QUEUE_OUT signal pulse, queue control logic 82 first sets a multiplexer 81 to select the longest-stored FQ number output of one of buffers 76–79 to provide that FQ number as input to each of VOQ buffers 83, though it does not immediately shift the FQ number into any of buffers 83. Queue controller 82 sets multiplexer 81 to select the highest-priority, non-empty VPQ buffer 76–78 for the virtual port number indicated by the VP data produce port rate scheduler 50. When all buffers 76–78 associated with a particular VP number are empty, queue control logic 82 tells multiplexer 81 to select the current FQ number output of FIFO buffer 79.

A separate VOQ FIFO buffer 83 is provided for each output switch port 15 (FIG. 1). Queue control logic 82 determines whether cells of the flow queue identified by FQ number output of multiplexer 81 are to be queued for departure on a cell-by-cell basis or on a packet-by-packet basis. In the later case, the queue control logic 82 also determines whether the next cell to be queued for departure is the last cell of a packet's cell sequence. To make such determinations, queue control logic 82 QUERY signal input to queue manager 40 of FIG. 4.

As described above, queue manager 40 keeps the BLOCK_ID of the longest-stored stored cell of each FQ in a HEAD fields of an entry of table 44 associated with the FQ and stores the BLOCK_ID of the next cell to be queued for departure from the cell memory is stored in the NEXT field. The PE bit stored in table 44 is set true when any currently stored cell of the flow queue has a true EOP bit and is otherwise set false. Queue manager 40 responds to the QUERY signal pulse form queue control logic 82 (FIG. 9) by looking up the BLOCK_ID of the NEXT cell in table 44 and then obtaining that cell's EOP bit from linked list 42, returning it along the PE bit from table 44 to queue control logic 82, pulsing an acknowledge signal ACK, and then updating the NEXT field of table 44 to point to a next cell to be queued for departure.

The returned EOP bit will be true when the NEXT cell to be queued for departure is the last cell of a packet sequence or is any cell of a sequence that is to be forwarded on a cell-by-cell basis. When that EOP bit is true, queue control logic 82 shifts the FQ number into one of FIFO buffers 83 identified by the VOQ number provided by port rate scheduler 50. If the EOP bit is false, indicating that the cell is to be forwarded on a packet-by-packet basis and is not the last cell of the packet sequence, then queue control logic 82 does not shift the FQ number into any of VOQ FIFO buffers 83.

Once it has decided whether to shift the FQ number into FIFO buffers 83 and has done so, thereby queuing either a cell or a packet for departure, queue control logic 82 determines whether the returned PE bit is true. When PE bit is not true, indicating that cells of the flow queue are to be forwarded on a packet-by-packet basis and that the last cell of a packet resides in the cell memory, control logic 82 does nothing more in response to the QUEUE_OUT signal pulse other than to shift the FQ data out of the particular FIFO buffer 76–79 selected by the VP data.

When the PE bit is true, queue control logic sends a DEPART signal pulse to queue manager 40 to tell it to signal data path controller 30 (FIG. 3) to read the longest-stored (HEAD) cell of that flow queue out of the cell memory and writ it into one of output queues 37 so that it may be forwarded to switch interface 24 of FIG. 2A. The VOQ number associated with that FIFO buffer 83 is forwarded to data path controller 30 to tell it which output queue 37 is to receive the cell. Queue manager 50 also returns to queue control logic 82 the EOP bit from the HEAD cell's entry in linked list 42, and pulses the ACK signal again. Queue manager 50 also updates the HEAD field of table 44 to point to a next longest-stored cell of the flow queue.

When the returned EOP bit is true, queue control logic 82 responds to the second pulse of the ACK signal by shifting the FQ number out of the VOQ FIFO buffer 83 currently selected by multiplexer 84. When the returned EOP bit is false, indicating that the departed cell is not the last cell of a sequence being forwarded on a packet-by-packet basis, queue control logic refrains from shifting the FQ bit out of that VOQ FIFO buffer 83. In either case queue control logic 82 shifts the FQ data out of the currently selected FIFO buffer 76–79.

Per Cell and Per Packet Mode Queuing

Flow queue rate scheduler 54 will normally usually operates in a "per-cell" mode wherein input programming data specifies maximum and minimum rates at which cells assigned to the various flow queues are to be forwarded in terms of a number of "cells per unit time". In such case hash rate tables 70–72 produce one output FQ number for each cell of the flow queue of that number that is to be forwarded from the cell memory as described above. However when flow rate scheduler 54 operates in a "per-packet" mode, the input program data specifies maximum and minimum forwarding rates for all flow queues in terms of "packets per unit time". In that case, hash rate table 70–72 an output FQ number for each sequence of cells to be forwarded from the cell memory.

When flow queue rate scheduler 54 is operating in its optional per-packet mode, queue control logic 82 shifts all FQ number outputs of multiplexer 81 into VOQ buffers 83. It does not first query queue manager 40 to determine the state of a next cell to be schedule for departure has its EOP bit set true before deciding whether to shift an FQ number into one of FIFO buffers 83. When the system operates in the "per-packet" mode, all flow queues must be scheduled for departure on a "sequence-by-sequence" basis rather than on a cell-by-cell basis.

Thus when the traffic manger is operating in the per-cell mode, flow queue forwarding bandwidths are allocated on a "cell per unit" time basis, and cells of each individual flow queue may be scheduled for departure either on a cell-by-cell or a sequence-by-sequence basis. On the other hand, when the traffic manager is operating its per-packet mode, flow queue forwarding bandwidths are allocated on a "packet per unit" time basis, and cells of each individual flow queue may be scheduled for departure only on a sequence-by-sequence basis.

Thus has been shown and described a network switch port traffic manager which can departure queue a cell sequence derived from packets on either a sequence-by-sequence or cell-by-cell basis depending on the value of the packets' FIN. While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

We claim:

1. A method for storing data conveyed by each of a plurality of packets arriving at a network switch port in a memory of the network switch port, and for thereafter reading the data out of the memory and forwarding the data from the switch port, wherein each packet also conveys a flow identification number (FIN), the method comprising the steps of:
   a. associating some values of the FIN with a sequence-by-sequence forwarding mode and associating other values of the FIN with a cell-by-cell forwarding mode,
   b. generating a separate cell sequence corresponding to each packet arriving at the network switch, wherein each cell contains a separate portion of the data conveyed by the packet;
   c. writing cells of each cell sequence generated at step b into separate storage blocks of the memory such that the memory stores cells of a plurality of cell sequences corresponding to the plurality of packets;
   d. assigning the sequence-by-sequence forwarding mode to those cell sequences that correspond to packets conveying FIN values associated with the sequence-by-sequence forwarding mode, and assigning the cell-by-cell forwarding mode to others of the cell sequences that correspond to packets conveying FIN values associated with the cell-by-cell forwarding mode;
   e. reading cells of each cell sequence out of the memory and forwarding them from the network switch port,
   wherein all cells of each cell sequence assigned the sequence-by-sequence forwarding mode are sequentially read out of the memory in uninterrupted succession during an interval when no cell of any other cell sequence is being read out of the memory; and
   wherein cells of separate cell sequences assigned the cell-by-cell forwarding mode are alternately read out of the memory such that cell sequences assigned the cell-by-cell mode are interleaved when read out of the memory.

2. A method for storing data conveyed by each of a plurality of packets arriving at a network switch port in a memory of the network switch port, and for thereafter reading the data out of the memory and forwarding the data from the switch port, wherein each packet also conveys a flow identification number (FIN), identifying a source of the packet, the method comprising the steps of:
   a. generating a separate cell sequence corresponding to each packet arriving at the network switch, wherein each cell contains a separate portion of the data conveyed by the packet;
   b. writing cells of each cell sequence generated at step a into separate storage blocks of the memory such that the memory stores cells of a plurality of cell sequences corresponding to the plurality of packets;
   c. assigning a forwarding mode to each cell sequence of the plurality of cell sequences in response to of the FIN included in each cell sequence's corresponding packet, such that a sequence-by-sequence forwarding mode is assigned to some of the cell sequences and such that a cell-by-cell forwarding mode is assigned to others of the cell sequences;
   d. reading cells of each cell sequence out of the memory and forwarding them from the network switch port,
   wherein all cells of each cell sequence assigned the sequence-by-sequence forwarding mode are sequentially read out of the memory in uninterrupted succession during an interval when no cell of any other cell sequence is being read out of the memory; and
   wherein cells of separate cell sequences assigned the cell-by-cell forwarding mode are alternately read out of the memory such that cell sequences assigned the cell-by-cell mode are interleaved when read out of the memory;
   e. assigning cells of each cell sequence generated at step a to one of a plurality of flow queues selected in response to the FIN included in the cell sequence's corresponding packet; and
   f. separately determining for each flow queue, an average rate at which cells of cell sequences assigned to that flow queue are to be read out of the cell memory, wherein cells assigned to each flow queue are read out of the cell memory at step d at the determined average rate for that flow queue.

3. The method in accordance with claim 2 further comprising the step of:
   g. maintaining a separate flow queue list corresponding to each flow queue,
   wherein the flow queue list includes a separate entry corresponding to each cell stored in the cell memory,
   wherein each cell's entry references that cell's storage location in the cell memory,
   wherein each flow queue list indicates an order in which cells assigned to its corresponding flow queue were written into the memory at step b, and
   wherein the flow queue list corresponding to each flow queue controls an order in which cells assigned to that flow queue are read out of the cell memory at step d.

4. The method in accordance with claim 3
   wherein each entry of each flow queue list maintained at step g also includes an EOP bit,
   wherein the EOP bit is set to a true state when the cell corresponding to the flow queue entry is a last cell of any cell sequence generated at step a,
   wherein the EOP bit is set to the true state when the cell corresponding to the flow queue entry is any cell of any cell sequence assigned the cell-by-cell forwarding mode at step c, and
   wherein the EOP is set to a false state when the cell corresponding to the flow queue entry is other than a last cell of any cell sequence assigned the sequence-by-sequence forwarding mode at step c.

5. The method in accordance with claim 4 wherein a state of the EOP bit included in each entry of the flow queue list corresponding to each cell sequence controls the forwarding mode of the cell sequence when the cell sequence is read out of the cell memory at step d.

6. An apparatus for storing data conveyed by each of a plurality of packets and for thereafter forwarding data conveyed by the packets, wherein each packet also conveys a flow identification number (FIN), the method comprising the steps of:
   a cell memory having a plurality of storage blocks;
   protocol processor means for generating a separate cell sequence corresponding to each packet, wherein each cell contains a separate portion of the data conveyed by the packet;
   data path controller means for writing cells of each cell sequence generated by the protocol processor into separate storage blocks of the cell memory such that the cell memory stores cells of a plurality of cell sequences corresponding to the plurality of packets and for thereafter reading cells of each cell sequence out of the cell memory when signaled to do so, and for thereafter forwarding read out cells from the network switch port; and queuing means for assigning a forwarding mode to each cell sequence of the plurality of cell sequences as a function of a value of the FIN included in each cell sequence's corresponding packet, such that a sequence-by-sequence forwarding mode is assigned to cell sequences generated from packets conveying some FIN values, and such that a cell-by-cell forwarding mode is assigned to cell sequences corresponding to packets conveying other FIN values, wherein the forwarding mode of each cell sequence is assigned irrespective of an order in which packets arrive at the network switch;

such that all cells of each cell sequence assigned the sequence-by-sequence forwarding mode are sequentially read out of the cell memory in uninterrupted succession during an interval when no cell of any other cell sequence is being read out of the cell memory; and such that cells of separate cell sequences assigned the cell-by-cell forwarding mode are alternately read out of the cell memory such that cell sequences assigned the cell-by-cell mode are interleaved when read out of the cell memory.

7. An apparatus for storing data conveyed by each of a plurality of packets and for thereafter forwarding data conveyed by the packets, wherein each packet also conveys a flow identification number (FIN), the method comprising the steps of:

a cell memory having a plurality of storage blocks;

protocol processor means for generating a separate cell sequence corresponding to each packet, wherein each cell contains a separate portion of the data conveyed by the packet;

data path controller means for writing cells of each cell sequence generated by the protocol processor into separate storage blocks of the cell memory such that the cell memory stores cells of a plurality of cell sequences corresponding to the plurality of packets and for thereafter reading cells of each cell sequence out of the cell memory when signaled to do so, and for thereafter forwarding read out cells from the network switch port; and queuing means for assigning a forwarding mode to each cell sequence of the plurality of cell sequences in response to the FIN included in each cell sequence's corresponding packet, such that a sequence-by-sequence forwarding mode is assigned to some of the cell sequences, and such that a cell-by-cell forwarding mode is assigned to others of the cell sequences, and for signaling the data path controller means when it is to read each cell out of the cell memory, such that all cells of each cell sequence assigned the sequence-by-sequence forwarding mode are sequentially read out of the cell memory in uninterrupted succession during an interval when no cell of any other cell sequence is being read out of the cell memory; and such that cells of separate cell sequences assigned the cell-by-cell forwarding mode are alternately read out of the cell memory such that cell sequences assigned the cell-by-cell mode are interleaved when read out of the cell memory, wherein the queuing means assigns cells of each cell sequence generated by the protocol processor means to one of a plurality of flow queues selected in response to the FIN included in the cell sequence's corresponding packet, wherein the queuing means separately determines for each flow queue, an average rate at which cells of cell sequences assigned to that flow queue are to be read out of the cell memory, and wherein the queuing means signals the data path controller means to read cells assigned to each flow queue out of the cell memory at the determined average rate for that flow queue.

8. The apparatus in accordance with claim 7
wherein the queuing means maintains a separate flow queue list corresponding to each flow queue,
wherein the flow queue list includes a separate entry corresponding to each cell stored in the cell memory,
wherein each cell's entry references that cell's storage location in the cell memory,
wherein each flow queue list indicates an order of arrival in the cell memory of cells assigned to its corresponding flow queue, and
wherein the queuing means consults the flow queue list corresponding to each flow queue to determine an order in which the data path controller means is to read cells assigned to that flow queue out of the cell memory.

9. The apparatus in accordance with claim 8
wherein each entry of each flow queue list maintained at also includes an EOP bit,
wherein the queuing means sets the EOP bit to a true state when the cell corresponding to the flow queue entry is a last cell of any cell sequence,
wherein the queuing means sets the EOP bit to the true state when the cell corresponding to the flow queue entry is any cell of any cell sequence assigned to the cell-by-cell forwarding mode queuing means, and
wherein the queuing means sets the EOP to a false state when the cell corresponding to the flow queue entry is other than a last cell of any cell sequence and is a cell of any sequence assigned to the sequence-by-sequence.

10. The apparatus in accordance with claim 9 wherein the queuing means consults the state of EOP bits included the flow queue list for each flow queue prior to signaling the data path controller means to read out cells of any cell sequence assigned to that flow queue to determine the forwarding mode of the cell sequence.

11. The apparatus in accordance with claim 10 wherein each cell of each cell sequence generated by the protocol processor also includes the FIN conveyed by the cell sequence's corresponding packet.

12. The apparatus in accordance with claim 11
wherein the data path controller means transmits a copy of the FIN included in each cell to the queuing means when the data path controller means writes the cell into a storage block of the memory, and
wherein the queuing means sets the state of the EOP bit included in the flow queue list corresponding to that cell in response to the transmitted copy of the FIN.

* * * * *